No. 794,227. PATENTED JULY 11, 1905.
T. W. JENNY.
SPEED CHANGING GEAR.
APPLICATION FILED MAY 25, 1904.
2 SHEETS—SHEET 1.
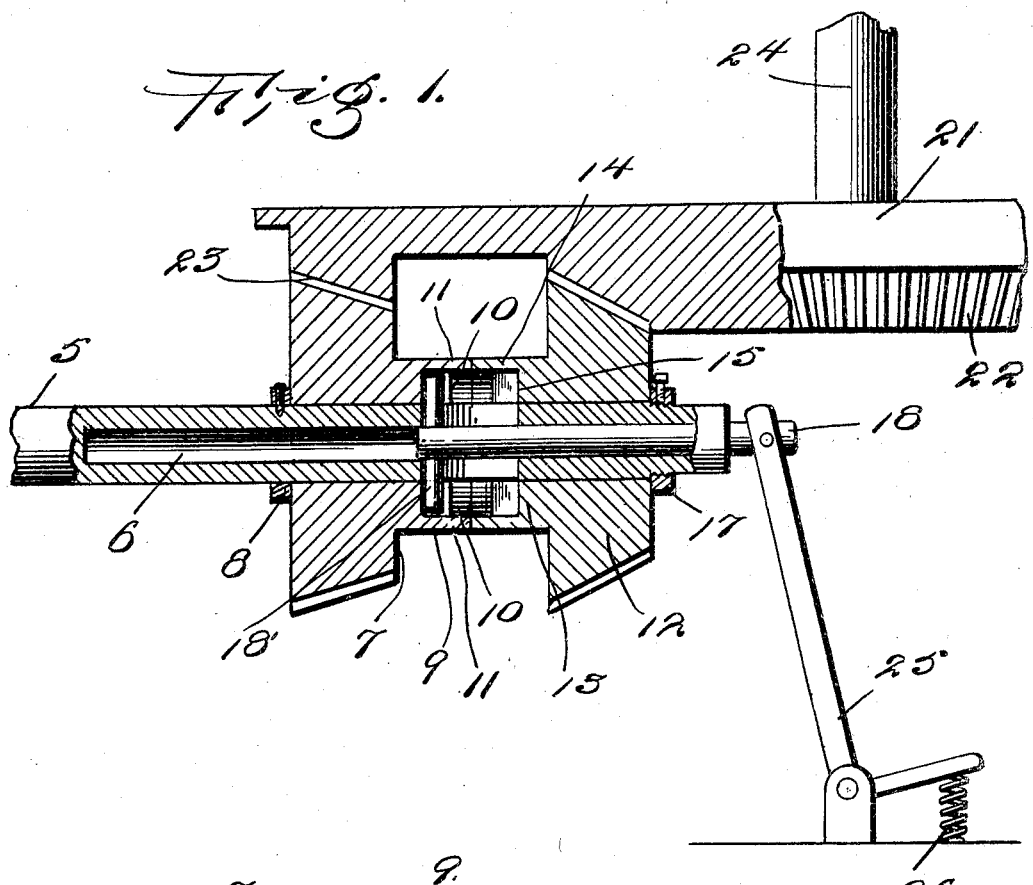
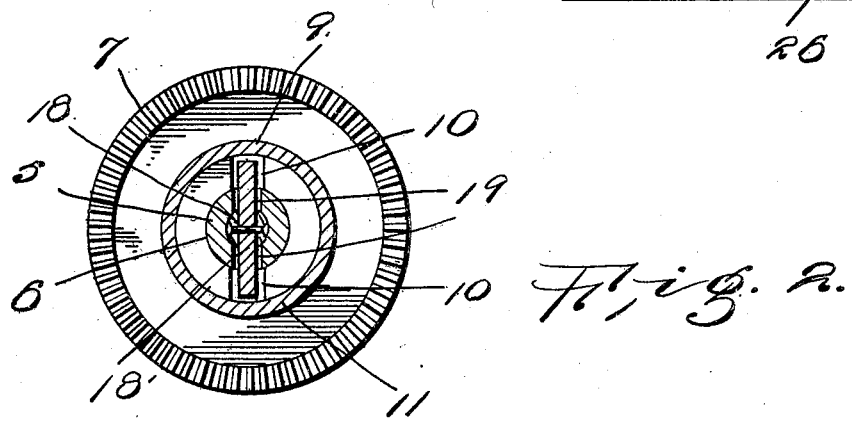
Witnesses
Inventor
T. W. Jenny
By
Attorneys No. 794,227. PATENTED JULY 11, 1905.
T. W. JENNY.
SPEED CHANGING GEAR.
APPLICATION FILED MAY 25, 1904.
2 SHEETS—SHEET 2.
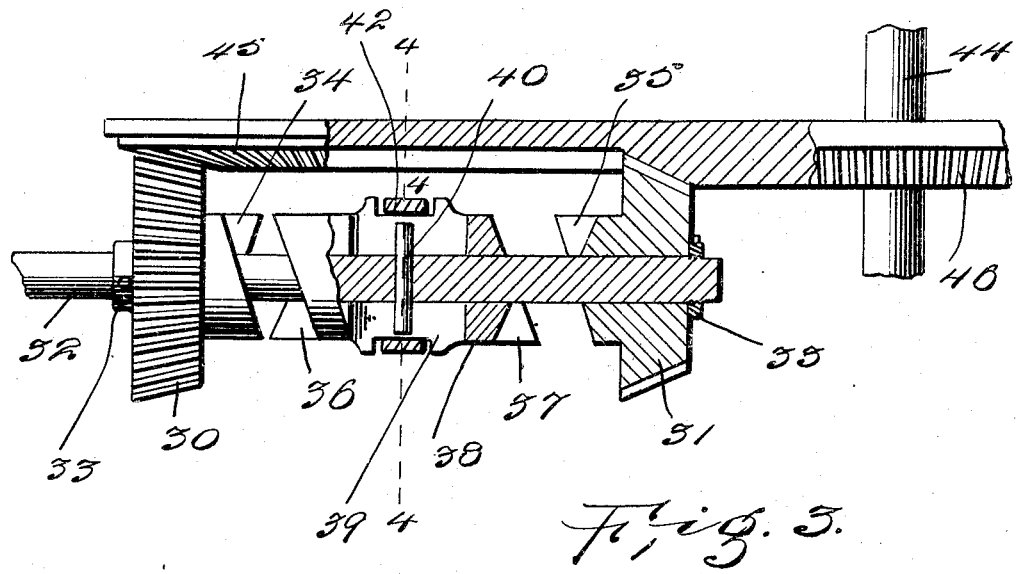
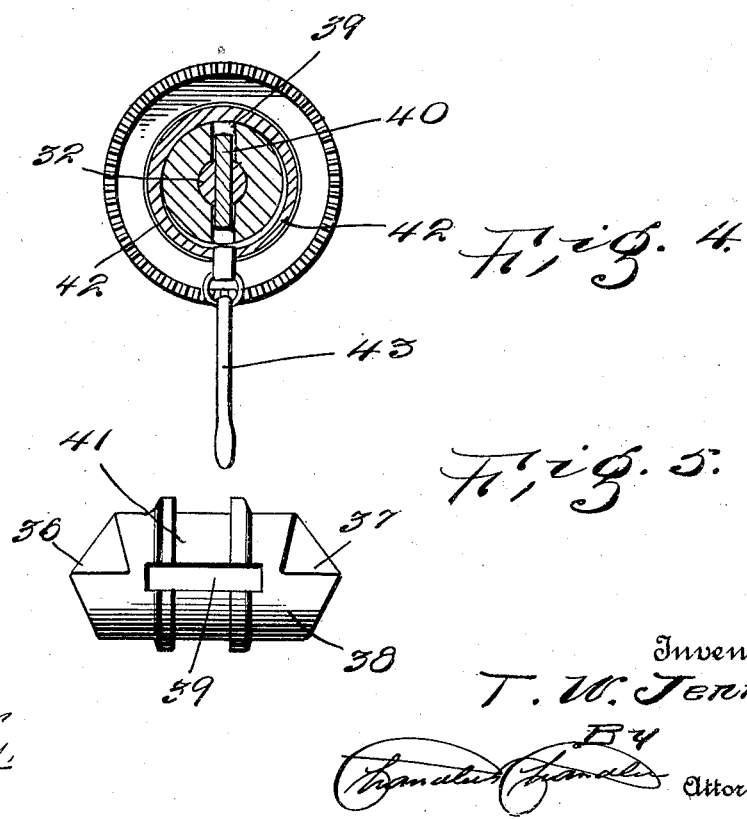
Witnesses
Inventor
T. W. Jenny
By
Attorneys No. 794,227.

Patented July 11, 1905.

UNITED STATES PATENT OFFICE.

THEADOR W. JENNY, OF STANTON, MISSOURI.

SPEED-CHANGING GEAR.

SPECIFICATION forming part of Letters Patent No. 794,227, dated July 11, 1905.

Application filed May 25, 1904. Serial No. 209,717.

*To all whom it may concern:*

Be it known that I, THEADOR W. JENNY, a citizen of the United States, residing at Stanton, in the county of Franklin, State of Missouri, have invented certain new and useful Improvements in Speed-Changing Gear; and I do hereby declare the following to be a full, clear, and exact description of the invention, such as will enable others skilled in the art to which it appertains to make and use the same.

This invention relates to speed-changing gears; and it has for its object to provide a simple, cheap, and efficient mechanism by means of which a variable speed may be transmitted from one shaft to another while the speed of the driving-shaft remains constant.

Other objects and advantages of the invention will be understood from the following description.

In the drawings forming a portion of this specification, and in which like numerals of reference indicate similar parts in the several views, Figure 1 is a section through the gearing in the common plane of the driving and driven shafts. Fig. 2 is a transverse section through the hub of one of the driving-gears, the driving-shaft, and the clutch-rod, and including the clutch-pin. Fig. 3 is a view, partially in longitudinal section and partially in elevation, showing a modification. Fig. 4 is a section on line 4 4 of Fig. 3. Fig. 5 is an end elevation of the clutch-sleeve.

Referring now to the drawings, there is shown a driving-shaft 5, which at one end is hollow, having the bore 6. Upon the hollow portion of the shaft 5 is rotatably mounted a beveled gear-wheel 7, which is held against longitudinal movement from the adjacent end of the shaft by the flange 8 on the shaft. From the minor end of the bevel-gear 7, which is in the direction of the recessed end of the drive-shaft, there extends an elongated hub 9, having radial slots 10 in its end, which slots communicate with the bore of the hub, but terminate short of the outer face of the hub, the hub having on its free end face an annular flange 11, which projects beyond the slotted face of the hub. Mounted rotatably upon the drive-shaft is a second beveled gear-wheel 12, having a hub 13 at its major end, and which hub has an annular flange 14, which abuts the flange 11, there being an annular chamber 15 between these abutting flanges and the drive-shaft for a purpose to be presently explained. The outer end face of the hub 13 has radial slots 16 therein which communicate with the bore of the hub, and the wheel 12 is held against longitudinal movement away from the wheel 7 by means of the nut 17.

A clutch-rod 18 is slidably mounted in the bore 6 of the shaft 5, and engaged transversely through this rod is a clutch-pin 18, which is passed through the radial slots 19 in the shaft 5 and projects beyond said shaft. The clutch-pin is movable with the clutch-rod to traverse the slots 19, so that said pin may lie with its ends in the chamber 15 or with its ends engaged with either of its slots 10 and 16, it being understood that when engaged with the slots 10 it clutches the gear-wheel 7 to the shaft 5 and when engaged with the slots 16 it clutches the wheel 12 to the shaft 5. It will be seen that the slots 19 lie within the inclosure of the hubs 9 and 13 and their flanges, so that foreign matter is prevented from entering and clogging the slots to prevent movement of the pin.

A double crown-gear 21 is provided, one set of teeth 22 of which meshes with the gear 7, while the outer set of teeth 23 meshes with the gear 12, so that this crown-gear, which is carried by a driven shaft 24, may be rotated from either of the wheels 7 and 12, it being of course understood that the double crown-gear and its driven shaft will be rotated at a higher speed when the gear 7 is clutched to the gear 5 than when the gear 12 is clutched thereto.

The clutch-rod may be shifted longitudinally in any desired manner; but there is illustrated a foot-lever 25, to which the clutch-rod is swiveled, and which when operated shifts the clutch-rod in one direction, the movement in the opposite direction being given by a spring 26, connected to the lever.

In Figs. 3 and 4 of the drawings there is shown a modification wherein two beveled gears 30 and 31 are rotatably mounted upon a driving-shaft 32 and are held against separation by the collars 33, fixed upon the shaft. The inner or mutually adjacent ends of the hubs of the gear-wheels have inclined clutch-faces 34 and 35, respectively, adapted for engagement by the clutch-faces 36 and 37, respectively, upon the ends of a sleeve 38, that is mounted upon the shaft 32 and has a passage 39 formed diametrically therethrough and in which lies the ends of a pin 40, that engages the shaft 32. The passage 39 extends sufficiently far longitudinally of the sleeve to permit of movement of the sleeve to engage either of its clutch-faces with the clutch-face of the corresponding gear-wheel, so that the gear-wheels may be interchangeably clutched to rotate with the shaft 32. The sleeve 38 is provided with a circumscribing groove 41 in which is engaged a strap 42, to which is connected a lever 43 for shifting the sleeve on the shaft 42. A second shaft 44 is disposed at right angles to the shaft 32 and carries a double bevel gear-wheel having the series of teeth 45 and 46, the teeth of one series being engaged by the wheel 30, while those of the other series are engaged by the wheel 31. The series of teeth are concentric, and when either of the gear-wheels 30 and 31 is clutched to the shaft 32 the shaft 44 is rotated at corresponding speed.

It will be understood that in practice other modifications may be made and any suitable materials and proportions may be used for the various parts without departing from the spirit of the invention.

What is claimed is—

In a speed-changing gearing the combination with a hollow shaft having radial slots communicating with its bore, of bevel gear-wheels rotatably mounted upon the shaft and having inwardly-projecting mutually-engaged hubs, said hubs having recesses in their mutually-adjacent faces and having radial slots communicating with the recesses, said slots being adapted for registration with the slots of the shaft, collars engaged with the shaft at opposite sides of the bevel-wheels, a sliding core engaged in the shaft and extending outwardly through one end thereof, a clutch-pin engaged in the inner end of the core and lying within the radial slots of the shaft, said pin being movable with the core to lie in the radial slots of the two bevel-gears interchangeably or to lie in the recesses of the gears, a double crown-gear meshed with the bevel-gears, a pivotally-mounted angle-lever, one arm of said lever being pivoted to the outer end of the core, the other end of said lever being adapted to receive pressure to move the core and therewith the pin and a spring arranged to hold the angle-lever yieldably against movement in one direction.

In testimony whereof I affix my signature in presence of two witnesses.

THEADOR W. JENNY.

Witnesses:
JOHN H. CHILES,
C. R. JENNY.